INVENTORS
ARDELL H. NELSON,
LEONARD J. HUTTER,
WILLIAM E. LATSHAW,
JOHN H. ADAMS,
JOHN TERLESKY &
DALE R. HAUSER

BY Shoemaker and Mattare
ATTORNEYS

INVENTORS
ARDELL H. NELSON,
LEONARD J. HUTTER,
WILLIAM E. LATSHAW,
JOHN H. ADAMS,
JOHN TERLESKY &
DALE R. HAUSER

BY Shoemaker and Mattare
ATTORNEYS

Feb. 16, 1971  A. H. NELSON ET AL  3,562,986
LIQUID STORAGE CONTAINER
Filed Oct. 4, 1968  3 Sheets-Sheet 3

INVENTORS
ARDELL H. NELSON,
LEONARD J. HUTTER,
WILLIAM E. LATSHAW,
JOHN H. ADAMS,
JOHN TERLESKY &
DALE R. HAUSER
BY Shoemaker and Mattare
ATTORNEYS 3,562,986
LIQUID STORAGE CONTAINER
Ardell H. Nelson, Coraopolis, Leonard J. Hutter, William E. Latshaw, and John H. Adams, Pittsburgh, John Terlesky, New Brighton, and Dale R. Hauser, Coraopolis, Pa., assignors to Pittsburgh-Des Moines Steel Company, Pittsburgh, Pa., a corporation of Pennsylvania
Filed Oct. 4, 1968, Ser. No. 765,268
Int. Cl. E04b 1/32; E04g 11/04
U.S. Cl. 52—246    16 Claims

ABSTRACT OF THE DISCLOSURE

A liquid storage container includes inner and outer vessels spaced from one another to define an insulating space therebetween. In one form of the invention, the side walls of the inner and outer vessels each have resilient blanket means disposed adjacent thereto and defining a space therebetween. The space between the resilient blanket means is filled with a mass of substantially free-flowing lightweight thermal insulating material. The roof of the inner vessel is supported by support means disposed within the inner vessel and extending vertically upwardly therewithin. A roof of the outer vessel in another form of the invention is supported by support means supported by the roof of the inner vessel. Further modifications of the invention include a vessel having only one side wall with insulating means disposed in surrounding relationship to the side wall and held in place adjacent the outer surface thereof.

BACKGROUND OF THE INVENTION

The present invention relates to a liquid storage container which is especially adapted to store normally gaseous substances in a liquefied state at pressures near atmospheric pressure and temperatures near the boiling point of the liquid. It is well recognized that by storing gaseous substances such as hydrogen, oxygen, methane, ethylene and the like at low temperatures whereby the substances are in a liquid phase, the volume of the stored substance is greatly reduced so that large quantities of the substances can be stored in an economical manner.

The same general storage system could also be used for warm liquids as well as cold liquids since the problems caused by temperature differentials are similar in both instances. However, a refrigerated liquid storage system is generally referred to herein since it is more often utilized.

Since the liquid being stored is at a very low temperature, a heavily insulated tank must be provided. Conventional insulation materials are quite expensive, and a number of problems are encountered when using same. It is desirable to employ a relatively inexpensive substantially free-flowing lightweight thermal insulating material such as expanded perlite and the like in the insulating space provided between the inner and outer vessels of the usual double-walled tank employed in refrigerated storage applications.

A particular problem encountered with this type of insulating material is the fact that such a free-flowing type of material has a tendency to settle or move vertically downwardly within the insulating space between the side walls of the inner and outer vessels when the side walls move away from or relative to one another, or in other words when the inner vessel side wall contracts or the outer vessel side wall expands.

On the other hand, when the side walls of the vessels move toward one another as when the inner vessel side wall expands or the outer vessel side wall contracts, the particles of the insulating material are compacted and crushed. As a result of this alternate compaction and crushing and downward settling due to relative movements of the side walls of the inner and outer vessels, the upper regions of the insulation space between the side walls of the two vessels may not be completely filled with insulation thereby resulting in excessive heat transfer through such voids.

Additionally, continued cyclic expansion and contraction thereby resulting in excessive heat transfer through in increased lateral pressure of the insulating material due to the compaction and crushing of the particles of insulating material which may cause buckling or rupturing of the vessels.

The side wall of the inner vessel moves laterally in accordance with temperature changes within the vessel as caused by filling of the vessel with cold liquid or evacuation of the vessel with a subsequent return to atmospheric temperature. Additionally, the height of the stored liquid within the vessel causes temperature gradients within the vessel itself. In addition to thermally induced lateral movements of the side wall of the inner vessel, stress induced lateral movements also occur.

Temperatures on the side wall of the outer vessel may fluctuate as much as 150° F. during a single day, thereby causing substantial thermally induced lateral movements of the outer vessel wall. Movements of the side wall of the outer vessel can be very detrimental since these movements will occur daily with ambient temperature changes.

It is accordingly necessary to provide means for preventing settlement and load-build-up of the free-flowing insulating material between the side walls of the vessels due to the lateral movements of both the inner and outer vessel side walls.

When settlement and compaction of the free-flowing insulating material between the side walls of the vessels is prevented by suitable means, there is little movement or settlement of any insulating material above this region since there is no place for this insulating material to shift to, and thus it remains where originally placed.

The roof of the inner vessel is generally supported either by the side wall of the inner vessel or by suspending the roof of the inner vessel from the roof of the outer vessel. This type of arrangement is often undesirable for structural reasons, and it is a particular object of the present invention to eliminate the necessity of supporting the roof of the inner vessel in this manner.

SUMMARY OF THE INVENTION

In one form of the present invention, resilient blanket means are disposed adjacent the outer surface of the side wall of the inner vessel as well as adjacent the inner surface of the side wall of the outer vessel. These resilient blanket means are spaced from one another, and a mass of substantially free-flowing lightweight thermal insulating material fills the space between the blanket means and exerts a lateral pressure against both of the blanket means.

Each of these resilient blanket means resists the active lateral pressure of the free-flowing insulating material disposed between the blanket means without substantial deflection of the blanket means. On the other hand, each of the blanket means is adapted to deflect or compress elastically without permanent set upon any increase in lateral pressures due to lateral movements of the adjacent side wall of one of the vessels resulting from stresses thereon or temperature changes. With a subsequent decrease in the lateral pressure due to lateral movements of the adjacent side wall of one of the vessels resulting from a change in stresses or temperature, the blanket means expands to its original position thus preventing any shift of the free-flowing insulating material.

Accordingly, when one of the side walls of the vessels expands or contracts, the resilient blanket means disposed adjacent thereto will contract or expand in a complementary manner so that the spacing between the resilient blanket means will remain substantially the same so as to prevent the mass of free-flowing material between the resilient blanket means from dropping downwardly within the insulating space or from being compacted and crushed.

The resilient blanket means and the free-flowing insulating material are placed in the insulating space between the inner and outer vessels when the storage tank is at ambient temperature, and the weight of the free-flowing material will cause the resilient blanket means to be slightly compressed. Accordingly, after several movements of the side walls of the vessels due to changes in stresses or temperature, an equilibrium position is reached by the resilient blanket means and thereafter only insignificant amounts of compaction and crushing take place.

In both of the above-mentioned forms of the present invention, support means is disposed within the inner vessel and extends vertically upwardly therewithin to support the roof of the inner vessel. In one of these forms of the invention, support means which is supported by the roof of the inner vessel serves to support the roof of the outer vessel.

In two further modifications of the invention, a vessel is provided having only one side wall, and suitable insulating means is disposed in surrounding relationship to the side wall and held in place adjacent the outer surface thereof. In these two latter modifications a ceiling is provided within the vessel disposed inwardly of and spaced from the roof, this ceiling being supported by support means disposed within the vessel and extending vertically upwardly therewithin.

DESCRIPTION OF THE PREFERRED EMBODIMENTS

Figure 1:
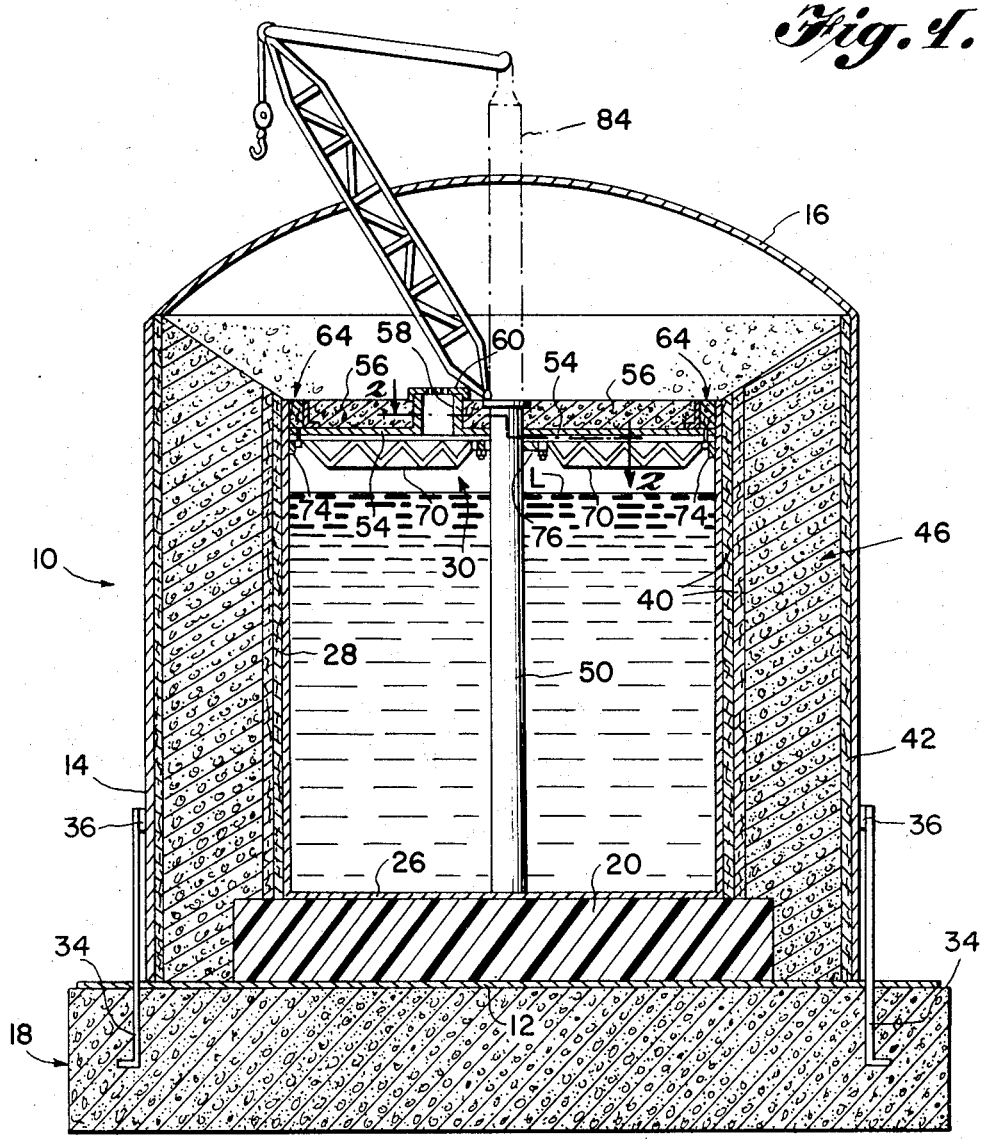
FIG. 1 is a vertical section through a storage tank according to the present invention.

Referring now to the drawings wherein like reference characters designate corresponding parts throughout the several views, a first form of the invention is illustrated in FIG. 1 and includes an outer vessel indicated generally by reference numeral 10 having a flat bottom 12, a substantially cylindrical side wall 14 and a roof 16. The bottom 12 rests upon a suitable foundation 18 formed of concrete and the like.

A body of load-bearing insulation 20 rests upon the bottom 12 of the outer vessel, this body of load-bearing insulation comprising for example, rigid cellular glass and the like. An inner vessel includes a bottom 26, a substantially cylindrical side wall 28 and a roof indicated generally by reference numeral 30. The bottom 26 of the inner vessel rests upon the body 20 of load-bearing insulation.

A plurality of anchor straps 34 are secured as by welding to pads 36 rigidly affixed as by welding to the outer surface of the side wall 14 of the outer vessel. These anchor straps extend downwardly and are embedded within the foundation 18 for rigidifying the structure.

The contained liquid is disposed within the inner vessel, the upper level of the liquid disposed within the vessel being indicated by reference character L. It should be understood that suitable means is provided for introducing liquid and gas into and discharging liquid and gas from the inner vessel including nozzles, valves, pipes and the like which are of conventional construction and which have not been shown for simplicity of illustration.

The outer vessel which serves primarily as an insulation protector and vapor barrier and for withstanding the lateral forces of the insulating material between the inner and outer vessels may be formed of metal or other materials suitable for this purpose, such as mild steel. The inner vessel which is designed to contain the liquefied gas and to withstand the lateral pressure of the insulating material between the two vessels may be formed of metal or other materials suitable for this purpose such as aluminum and the like having the necessary properties over the temperature ranges to which it is subjected.

A first resilient blanket means includes one or more adjacent layers of resilient material 40 disposed in surrounding relationship to the outer surface of the side wall 28 of the inner vessel. A second resilient blanket means includes one or more adjacent layers of resilient material 42 disposed adjacent to the inner surface of the side wall of the outer vessel and is disposed in opposed facing relationship to the first-mentioned blanket means and is substantially coextensive therewith. The two resilient blanket means are disposed in contact or close proximity with the associated side walls of the inner and outer vessels respectively and the blanket means define a space therebetween. The resilient blanket means are retained in operative position until installation of the free-flowing insulating material by adhesive or suitable fasteners (not shown) affixed to or extending from the adjacent side walls of the associated vessel. After the substantially free-flowing insulating material has been installed, the resilient blanket means are secured permanently in their operative position by the lateral pressure of the substantially free-flowing insulation.

It will be noted that the thickness of the blanket means adjacent the side wall of the inner vessel is substantially greater than the thickness of the blanket means disposed adjacent the side wall of the outer vessel. In the illustrated embodiment, the first-mentioned blanket means is two or more times thicker than the thickness of the second-mentioned blanket means. This is due to the fact that with the inner vessel at a much lower temperature than the outer vessel, the respective movements are greater. However, the more frequent daily ambient movement of the outer vessel wall can be more detrimental to settlement of the substantially free-flowing insulation material if the blanket means adjacent to the outer vessel wall is not used.

The space between the two blanket means as well as the space between the spaced roofs 16 and 30 of the outer and inner tanks respectively is filled with a mass of substantially free-flowing lightweight thermal insulating material preferably of a granular nature 46. In a typical example, the free-flowing insulating material may comprise expanded perlite. This insulating material must have a particle size sufficiently small to limit convection losses by circulation of gases through the packed mass.

To avoid combustion problems as for example encountered in the storage of liquid oxygen, the free-flowing insulation material is preferably an inorganic substance such as expanded perlite, expanded vermiculite, inorganic aerogels such as silica aerogel and the like. This free-flowing insulating material may also for example comprise granulated cork, shredded foamed polystyrene and the like. Other fibrous materials such as shredded wood or bark, glass fiber waste or mineral wool may be used. In any event, the insulating material should be non-cohesive or substantially free-flowing.

The resilient blanket means must resist lateral pressure of the free-flowing insulating material without substantial deflection but must deflect or compress elastically without permanent set when the associated side walls of the respective vessels move in a lateral direction. In other words, when the side wall of the inner vessel contracts, the blanket means 40 will expand, and on the other hand, when the side wall of the inner vessel expands the blanket means 40 will be compressed. On the other hand, when the side wall of the outer vessel contracts, the blanket means 42 will be compressed, whereas when the side wall of the outer vessel expands, blanket means 42 will also expand. In this manner, the annular space between the two resilient blanket means is maintained substantially constant.

The resilient blanket means must retain its resilient characteristics at extremely low temperatures, and a preferred blanket means comprises sheets of matted glass fibers, formed into a resilient mass and held in place by means of a suitable binder. For example, a low density resilient blanket means formed of fine glass fibers bonded together by a binder such as a thin film of phenol-formaldehyde resin binder is suitable. The nominal diameters of the glass fibers of the blanket means may be less than 0.00015 inch. This type of blanket means may have a density of approximately two pounds per cubic foot.

The thickness of the blanket means is sufficient so that it is adapted to expand and be compressed to the necessary degree to accommodate the movements of the associated side walls of the respective vessels.

The resilient blanket means may also be formed of other fibrous or suitable flexible materials, and for example the blanket means may be made of acetate synthetic fibers suitably bonded together.

A support means 50 is provided centrally within the inner vessel and extends upwardly from the bottom 26 thereof. The roof of the inner vessel includes a plate 54 upon which is supported a suitable body of insulating material 56. This body of insulating material may comprise glass fiber, rock wool, perlite, slabs of rigid polyurethane foam and the like. A vent hole 58 is provided through plate 54 and the body of insulating material, this vent hole being covered by a plate 60 which is foraminous to allow the escape of gas therethrough into the space between the roof of the inner vessel and the outer vessel.

An annular seal means 64 is disposed between the outer periphery of roof 30 and the adjacent side wall 28 of the inner vessel. This annular seal means may comprise a band of glass fiber under compression, the resilient characteristics of the glass fiber insuring an effective seal at all times to prevent the roof insulation from entering into the interior of the tank.

Figure 2:
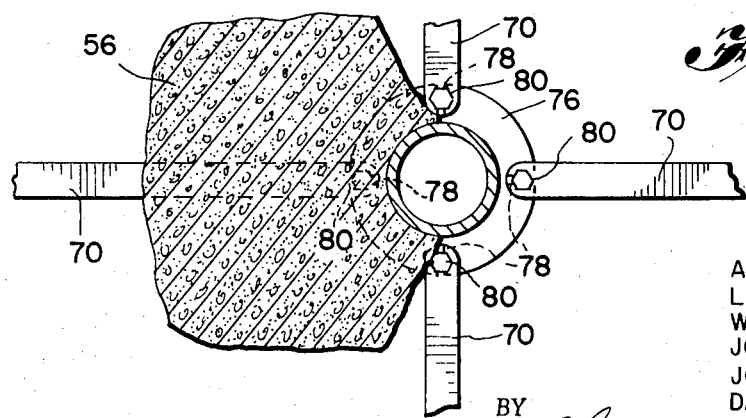
FIG. 2 is a sectional view on an enlarged scale taken substantially along line 2—2 of FIG. 1 looking in the direction of the arrows.

Plate 54 is carried by a plurality of stiffener means in the form of trusses 70 shown as being four in number in FIG. 2, the outer ends of these trusses being suitably secured to the side wall of the inner vessel, As illustrated, a plurality of spaced brackets 74 are secured as by welding to the inwardly facing surface of the side 28 of the inner vessel, and the outer ends of trusses are bolted thereto, although the outer ends of these trusses could be welded directly to the side wall of the inner vessel if so desired.

The upper end of support means 50 is provided with an annular collar 76 which supports the inner ends of the trusses 70. This collar is provided with a plurality of spaced radially extending recesses 78 shown as being four in number and opening through the outer periphery of the collar.

The inner ends of the trusses are secured to collar 76 by nut and bolt assembly 80 extending downwardly through the holes provided in the inner ends of the trusses and aligned slots 78 in the collar 76. The slots 78 permit relative radial movement between the inner ends of the trusses and the collar 76 secured to support means 50. Accordingly, this means of supporting the trusses and the roof of the inner vessel permits relative movement between the roof and the support means which may be caused by expansion and contraction of the components of the various temperature conditions.

The support means 50 of this form of the invention serves a dual purpose. It supports the roof of the inner vessel in the completed tank as illustrated, and it is also used for supporting a mast or boom indicated by phantom lines 84 which is utilized during erection of the tank. In other words, a mast or boom 84 is mounted upon the support means 50 when the tank is being erected, this boom or mast subsequently being removed when the tank is completed.

Figure 3:
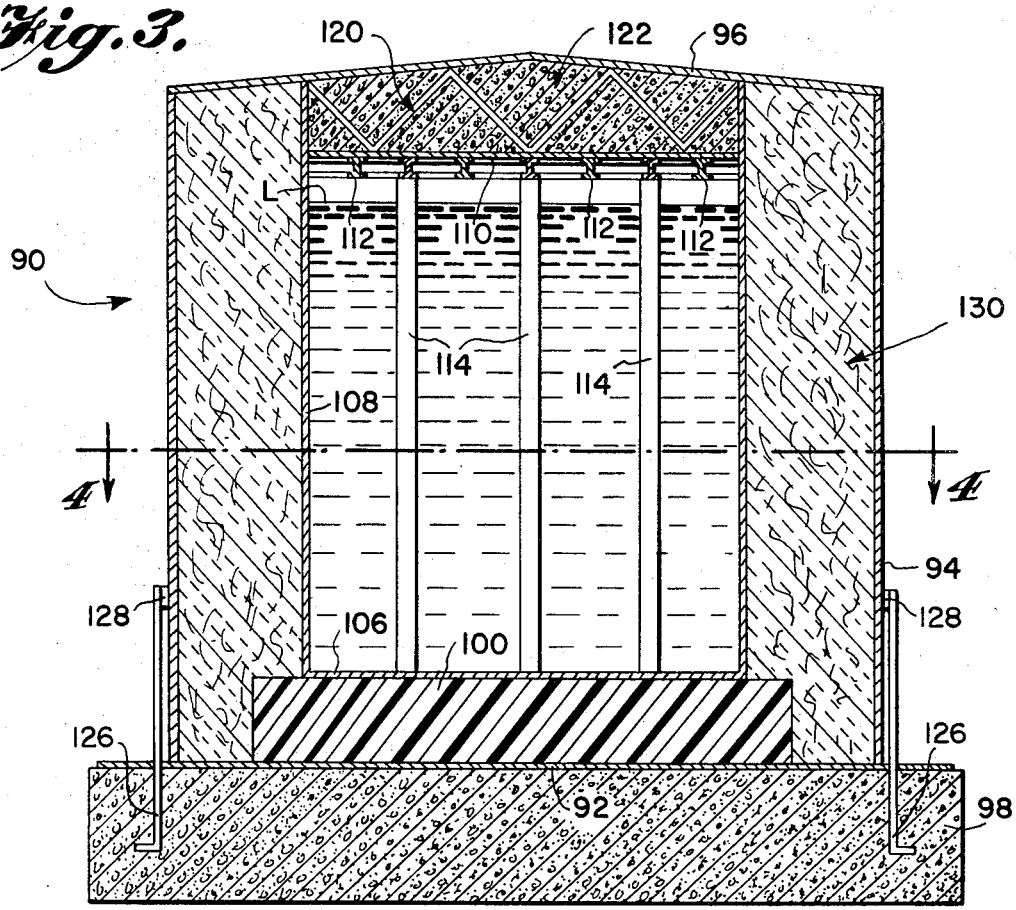
FIG. 3 is a vertical section through a modified form of storage tank.
Figure 4:
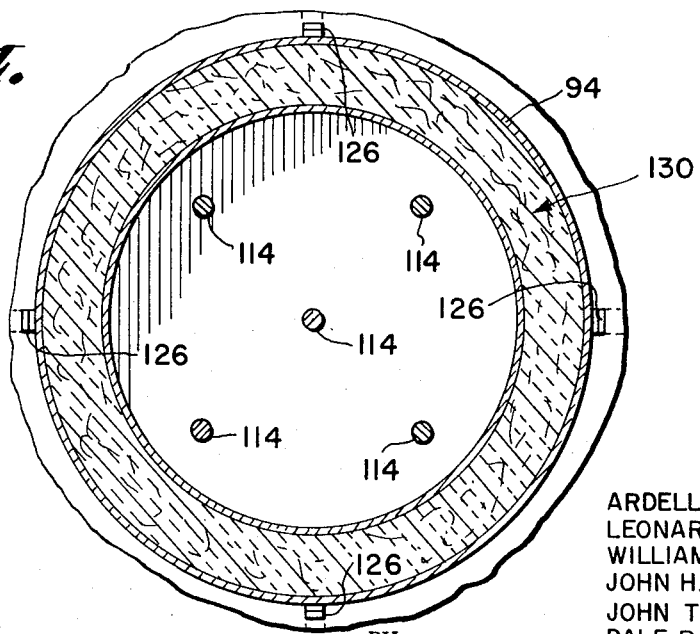
FIG. 4 is a sectional view on a reduced scale taken substantially along line 4—4 of FIG. 3 looking in the direction of the arrows.

Referring now to FIGS. 3 and 4 of the drawings, still another form of storage tank is illustrated. An outer vessel indicated generally by reference numeral 90 includes a bottom 92, a side wall 94 and a sloping roof 96. The bottom 92 rests upon a suitable foundation 98.

A body of load-bearing insulation 100 is similar to the body 20 previously described and rests upon the bottom 92 of the outer vessel. An inner vessel includes a bottom 106, a side wall 108 and a roof 110, the bottom 106 of this inner vessel resting upon the body 100 of load-bearing insulation.

The roof 110 of the inner vessel includes a plurality of roof rafters 112 extending along the bottom thereof, certain ones of these roof rafters in turn being supported by a plurality of vertically extending columns or support members 114 extending upwardly from the bottom 106 of the inner vessel. These columns or support members serve to support the roof of the inner vessel.

Truss support means 120 is in turn connected between the roof of the inner vessel and the roof of the outer vessel for supporting the roof of the outer vessel. A body of insulating material 122 fills the space between the roof of the inner and outer vessels, this body of insulating material comprising expanded perlite or the like.

A plurality of anchor straps 126 which are shown as being four in number are suitably secured to pads 128 rigidly affixed to the outer surface of the side wall of the inner vessel, these anchor straps extending downwardly and having the lower ends thereof embedded within the foundation 98 to rigidify the structure.

A body of insulation 130 fills the space between the side walls of the inner and outer vessels, this insulation means being of a fibrous nature and preferably being formed of glass fiber or a substance similar to that employed in the resilient blanket means described hereinbefore.

Figure 5:
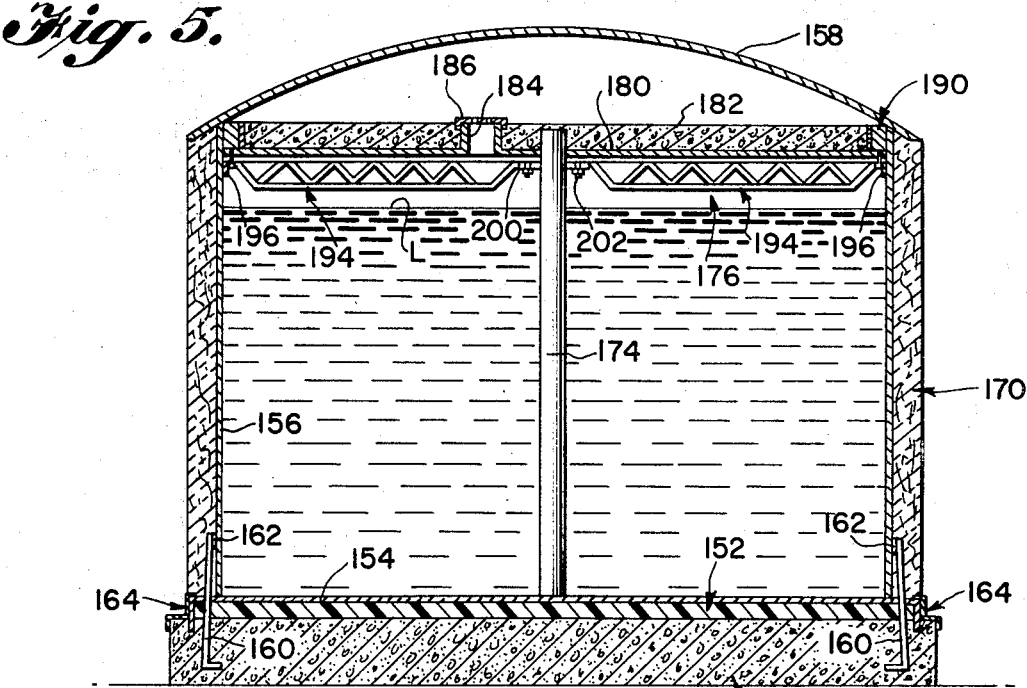
FIG. 5 is a vertical section through a further modified form of storage tank.

Referring now to FIG. 5 of the drawings, a further modification of the invention is illustrated which is similar to that shown in FIGS. 1 and 2 of the drawings. A foundation 150 formed of concrete or the like is provided and supports a body of load-bearing insulation 152.

The vessel in this form of the invention includes a bottom 154 and a substantially cylindrical side wall 156. It will be noted that only one side wall is provided in this form of the invention, a roof 158 being supported by this side wall.

A plurality of anchor straps 160 are secured as by welding to pads 162 rigidly affixed as by welding to the outer surface of the side wall of the vessel. These anchor straps extend downwardly through the body of load-bearing insulation and are embedded within the foundation 150 for rigidifying the structure. Suitable flashing means 164 is provided about the lower portion of the structure.

The contained liquid is disposed within the vessel, the upper level of the liquid being indicated by reference character L. As in the previous modifications, suitable means is provided for introducing liquid and gas into and discharging liquid and gas from the vessel including nozzles, valves, pipes and the like of conventional construction.

A body of insulation 170 is disposed in surrounding relationship to side wall 156 and is held in place adjacent the outer surface thereof. This body of insulation extends throughout the height of the side wall. Insulation 170 may be for example formed of urethane foam, Styrofoam, or glass fiber and the like suitably waterproofed on the outer surface thereof. The insulation may be for example in the form of blankets or blocks which can be held in place by bands of aluminum and the like extending around the vessel. Mastic may be utilized in order to build up several layers of insulation so as to provide a body of insulation of the desired thickness. In the case of urethane foam for example, the insulation may be sprayed onto the outer surface of the side wall of the vessel and bonded thereto.

A support means 174 is provided centrally within the vessel and extends upwardly from the bottom 154 thereof. A ceiling indicated generally by reference numeral 176 is disposed inwardly of and spaced from the roof 158, this ceiling being supported by support means 174.

This ceiling is similar in construction to the roof 30 previously described in connection with the structure shown in FIG. 1 and includes a plate 180 upon which is supported a suitable body of insulating material 182. This body of insulating material may be similar to the body 56 previously described. A vent hole 184 is provided through plate 180 and the body of insulating material, this vent hole being covered by a plate 186 which is foraminous to allow the escape of gas therethrough.

An annular seal means 190 similar to the seal means 64 previously described is disposed between the outer periphery of ceiling 176 and the adjacent side wall 156 of the vessel to provide an effective seal which prevents the roof insulation from entering into the interior of the tank.

Plate 180 is carried by a plurality of stiffener means in the form of trusses 194 similar to the trusses 70 previously described. These trusses may for example be four in number, the outer ends of the trusses being secured to the side wall of the inner vessel as by welding or bolting to a plurality of spaced brackets 196, these brackets being rigidly affixed to the inner surface of the side wall 156 of the vessel.

The upper end of support means 174 is provided with an annular collar 200 similar to the annular collar 76 previously described. The collar is provided with a plurality of spaced radially extending recesses, and the inner ends of the trusses are secured to the collar by nut and bolt assemblies 202 extending downwardly through holes provided in the inner ends of the trusses and the aligned recesses formed in the collar. This arrangement permits relative radial movement of the trusses with respect to the collar as previously described.

As described in connection with FIG. 1, the support means 174 may also be used for supporting a mast or boom utilized during erection of the tank, the boom being subsequently removed when the tank is completed.

Figure 6:
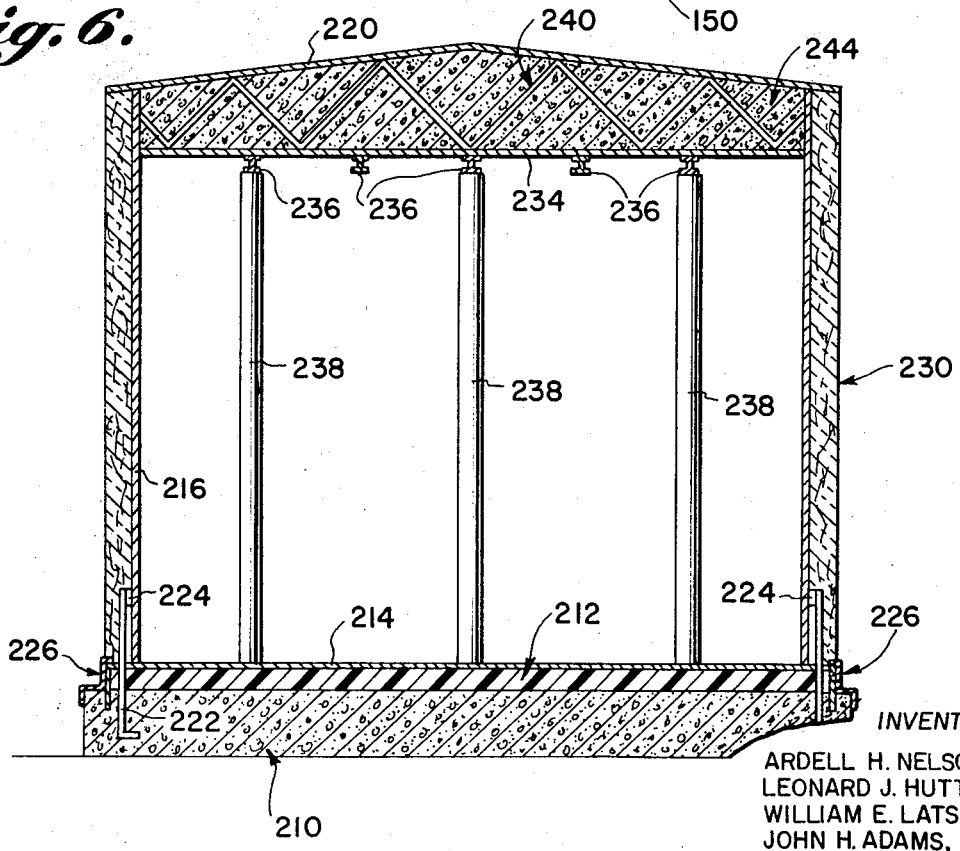
FIG. 6 is a vertical section through still another modified form of storage tank.

Referring now to FIG. 6 of the drawings, still another form of storage tank is illustrated. A foundation 210 of concrete or the like is provided and a body of load-bearing insulation 212 rests on this foundation. The vessel includes a bottom 214 and a generally cylindrical side wall 216 which supports a sloping roof 220.

A plurality of anchor straps 222 are suitably secured to pads 224 rigidly affixed to the outer surface of the side wall of the vessel, these anchor straps extending downwardly and having the lower ends thereof embedded within the foundation 210 to rigidify the structure. Suitable flashing 226 is provided around the lower portion of the structure.

A body of insulation 230 identical with the body of insulation 170 shown in FIG. 5 is provided, the body of insulation 230 being disposed in surrounding relationship to side wall 216 and being suitably held in place adjacent the outer surface thereof.

A ceiling 234 is disposed in the vessel inwardly of and spaced from the roof 220 and includes a plurality of rafters 236 extending along the bottom thereof, certain ones of these rafters in turn being supported by a plurality of vertically extending columns or support members 238 extending upwardly from the bottom 214 of the vessel. The arrangement is similar to that shown in FIGS. 3 and 4 of the drawings.

The columns or support members 238 serve to support the ceiling 234, and truss support means 240 is in turn connected between the ceiling and the roof 220 for supporting the roof. A body of insulating material 244 fills the space between the ceiling and the roof, this insulating material comprising expanded perlite or the like.

As this invention may be embodied in several forms without departing from the spirit or essential characteristics thereof, the present embodiment is therefore illustrative and not restrictive and since the scope of the invention is defined by the appended claims, all changes that fall within the metes and bounds of the claims or that form their functional as well as conjointly cooperative equivalents are therefore intended to be embraced by those claims.

What is claimed is:

1. A liquid storage container comprising:
   (a) an inner closed vessel having a side wall and a roof;
   (b) an outer vessel having a side wall and a roof; the side wall of said outer vessel being spaced outwardly of the side wall of said inner vessel to define an insulating space therebetween;
   (c) first insulating means disposed within said insulating space;
   (d) the roof of said outer vessel spaced outwardly of the roof of said inner vessel;
   (e) second insulating means disposed between the roof of said inner vessel and the roof of said outer vessel; and
   (f) columnar support means disposed within said inner vessel and extending axially vertically upwardly therewithin, the roof of said inner vessel being supported by said support means and mounted for movement relative to said support means.

2. Apparatus as defined in claim 1 including:
   (a) means supported by the roof of said inner vessel for supporting the roof of said outer vessel.

3. Apparatus as defined in claim 2 wherein:
   (a) said second insulating means comprises a mass of substantially free-flowing lightweight thermal insulating material.

4. Apparatus as defined in claim 1 wherein:
   (a) said support means includes a portion disposed at the central part of said vessel.

5. Apparatus as defined in claim 1 wherein:
   (a) said first insulating means comprises fibrous insulating material substantially filling the insulating space between the side wall of said inner vessel and the side wall of said outer vessel.

6. Apparatus as defined in claim 1 including:
   (a) a resilient annular seal means disposed between the outer periphery of the roof of the inner vessel and the side wall of the inner vessel to prevent the second insulating means from passing peripherally downwardly around said inner roof into said inner vessel.

7. Apparatus as defined in claim 1 wherein:
   (a) said support means includes a portion disposed at the central part of said inner vessel.

8. Apparatus as defined in claim 1 including:
   (a) stiffener means on the roof of said inner vessel.

9. A liquid storage container comprising:
   (a) a vessel having at least one side wall and a roof;
   (b) first insulating means disposed in surrounding relationship to said side wall and held in place adjacent the outer surface of said side wall;
   (c) a ceiling in said vessel disposed inwardly of and spaced from said roof;
   (d) second insulating means disposed between said ceiling and said roof; and
   (e) columnar support means disposed within said vessel and extending axially vertically upwardly therewithin, said ceiling being supported by said support means and mounted for movement relative to said support means.

10. Apparatus as defined in claim 9 including:
(a) means supported by said ceiling for supporting the roof of said vessel.

11. Apparatus as defined in claim 10 wherein:
(a) said second insulating means comprises a mass of substantially free-flowing lightweight thermal insulating material.

12. Apparatus as defined in claim 9 including:
(a) resilient annular seal means disposed between the outer periphery of said ceiling and said side wall.

13. Apparatus as defined in claim 9 including:
(a) stiffener means on said ceiling.

14. A liquid storage container as in claim 9 wherein:
(a) said vessel has only one side wall and a roof.

15. A liquid storage container, comprising:
(a) at least one side wall;
(b) insulated roof means supported in the side wall with its peripheral edge portion received within the upper marginal edge portion of the side wall;
(c) first insulation means disposed adjacent to said side wall;
(d) second insulation means disposed over said roof and within the upper marginal edge portion of said side wall;
(e) columnar support means extending axially vertically within the container, said roof supported on said support means;
(f) said support means including a plurality of horizontally disposed radially extending truss members underlying and supporting said roof;
(g) a collar secured adjacent the upper end of said columnar support means and including a plurality of circumferentially disposed radially extending slots opening outwardly through the peripheral edge of said collar, one end of said truss members supported on said collar; and
(h) bolt means extending through said one end of said truss members and said slot means for holding said truss members to said collar while enabling relative radial movement between said truss members and said collar.

16. A liquid storage container, comprising:
(a) at least one side wall;
(b) insulated roof means supported in the side wall with its peripheral edge portion received within the upper marginal edge portion of the side wall;
(c) first insulation means disposed adjacent to said side wall;
(d) second insulation means disposed over said roof and within the upper marginal edge portion of said side wall;
(e) columnar support means extending axially vertically within the container, said roof supported on said support means;
(f) said insulated roof including a bottom plate upon which is disposed said second insulating means;
(g) an annular upstanding flange on the marginal edge portion of said plate and spaced inwardly from the periphery thereof;
(h) seal means disposed on the peripheral edge portion of said plate between said side wall and said upstanding flange; and
(i) bracket means fixed to said side wall under the peripheral edge portion of said plate and upon which said insulated roof is supported.

References Cited

UNITED STATES PATENTS

| | | | |
|---|---|---|---|
| 1,445,091 | 2/1923 | Kueffer | 52—66 |
| 2,670,818 | 3/1954 | Hacker | 52—80 |
| 3,225,955 | 12/1965 | Farkas et al. | 220—9A1 |
| 3,438,215 | 4/1969 | Frijlink | 220—26D |
| 3,481,504 | 12/1969 | Nelson | 220—9A1 |
| 1,371,427 | 3/1921 | Kerr | 114—74A |
| 2,520,883 | 8/1950 | Kornemann et al. | 220—9A-1 |
| 2,905,352 | 9/1959 | Henry | 114—74A |
| 3,106,307 | 10/1963 | Morrison | 220—9F |
| 3,352,443 | 11/1967 | Sattelberg et al. | 220—9A |
| 3,383,004 | 5/1968 | Closner | 220—9F |

FOREIGN PATENTS

| | | | |
|---|---|---|---|
| 1,109,255 | 4/1968 | Great Britain | 220—9A1 |

HENRY C. SUTHERLAND, Primary Examiner

J. L. RIDGILL, JR., Assistant Examiner

U.C. Cl. X.R.

52—573; 220—9